(12) United States Patent
Kurtenbach

(10) Patent No.: US 6,879,373 B2
(45) Date of Patent: Apr. 12, 2005

(54) MAKEOVER WORKFLOW PROCESS IN A DIGITAL PHOTOFINISHING SYSTEM

(75) Inventor: Thomas J. Kurtenbach, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/643,847

(22) Filed: Aug. 19, 2003

(65) Prior Publication Data

US 2005/0041223 A1 Feb. 24, 2005

(51) Int. Cl.[7] .............................................. G03B 27/42
(52) U.S. Cl. ............................ 355/40; 355/41; 355/77
(58) Field of Search ............................... 355/38, 40, 41, 355/69, 77; 396/567, 639

(56) References Cited

U.S. PATENT DOCUMENTS 5,194,892 A * 3/1993 Robison ...................... 355/40
6,157,435 A 12/2000 Slater et al.
2002/0131080 A1 * 9/2002 Enomoto .................... 358/1.15

* cited by examiner

Primary Examiner—D. Rutledge
(74) Attorney, Agent, or Firm—David A. Novais

(57) ABSTRACT

The present invention relates to a makeover workflow method or system that can be associated with a digital photofinishing arrangement and allows selected images or products to be made again to replace a product which has been damaged, incorrectly produced, or which may need correction to the image content for appearance defect removal. The makeover workflow system or method of the present invention utilizes processing data or metadata used to process the original image to remanufacture the same or improved product or image. With the processing data or metadata from the original processing of the image, changes can be made by adjustment to the first time corrections which are added to or subtracted from the original metadata or processing data. The makeover process of the present invention permits a reproduction of a defective image from the acquired image without having to go back to the original film or input media.

19 Claims, 4 Drawing Sheets

MAKEOVER WORKFLOW PROCESS IN A DIGITAL PHOTOFINISHING SYSTEM

FIELD OF THE INVENTION

The present invention relates to a makeover workflow process or system that is associated with a digital photofinishing system. The makeover workflow process or system of the present invention is adapted to allow selected products to be made again to replace products which may have been damaged, incorrectly produced, or which may need correction to the image content for improved appearance or defect removal.

BACKGROUND OF THE INVENTION

With the advent of digital technology in photofinishing systems, many opportunities are provided for improving the quality of the output of an image or photographic product produced by a photofinishing system. However, in some instances, the photographic products or images are produced having defects caused by the photofinishing system itself during the production process or caused by poor conditions during the capture of the image.

Products or images that require makeover in a photographic system or lab are determined by inspection and are basically products or images which include defects that are outside of acceptable quality limits established for those products or images. The reasons for failure during inspection include physical damage, visual flaws such as streaks or splashes due to processing problems, or failure of automatic printing systems to produce the image with the correct color or density.

Conventionally, an inspection of products or images is often done as a formal step in the production process or it can be done by observation during a finishing or packaging process. Typical products of the photofinishing system or lab are photographic prints that include images on paper or other support material. Photographic prints produced in high volume are typically produced on long rolls or webs of support material. Low volume production can be done on cut sheets of support material. In either case, the products packaged and shipped are cut into individual items. Inspection of products or images is done on either cut sheets or rolls of products, although high volume inspection is typically done on rolls of product. Those products or images which fail inspection are marked labeled or otherwise indicated as being different from the good or acceptable products or images. The type of indication is typically suited to the means by which the defective product is handled later in the process.

In current photofinishing systems or labs, an order that contains a product or image which needs makeover is separated from the other orders in the production batch with which it was associated. This is usually accomplished during a finishing or packaging process where the production batch is separated into individual orders and the components of each order are combined. For a typical photographic order, the components include the consumer's envelope, cut filmstrip, cut prints, packaging wallets and sleeves, and possibly other products such as CDs. The orders which require makeover are collected and the failed products or images examined by a makeover write-up operator. For each product in an order needing a makeover for color or density, appropriate correction instructions are written for those products. Products with only physical or process damages are made over without correction. The makeover order contents are organized and fastened together so the products to be made over are obvious and easily accessible. The order is typically placed with other orders that will be sent through the makeover process together as a makeover batch. There are normally significant queuing delays at either the packaging or the makeover write-up area while a large enough quantity of orders with similar types of film or service requirements are accumulated to make an efficient size batch. Small batches are inefficient in production due to the extra handling and set-up at the makeover equipment (for example, laminators, printers) and the packaging needed for the makeover process.

In current photofinishing systems or labs, batches of orders requiring makeover of photographic prints are typically sent to a laminating station to prepare a laminated roll of film strips to reproduce the defective photographic prints, usually on an optical printer equipped to handle the laminated roll of film strips. In a conventional photofinishing system or lab, an optical printer would have been used to make the prints originally from a long roll of film which includes individual rolls of consumer film that have been spliced together for processing and printing. The film is typically in strips at this point because it has been previously cut on a finishing station into individual consumer rolls and each roll into strips of usually four frames each. This is typically done at the same time and on the same equipment which cuts the roll of prints into individual prints and separates the orders. The filmstrips needed for makeover must then be made compatible for the optical printing machine. The laminator operator will remove the defective product, the original filmstrip, and the makeover instructions from the order. The laminator operator also separates, selects, examines, cleans, orients and inserts the filmstrip to be laminated (the machine uses an adhesive or tapes the strip onto the edge of a continuous roll of paper) onto the web of laminated filmstrips. For each filmstrip, the operator enters the frame or frames to be reprinted and the respective correction instructions which are recorded by paper punches and on a diskette and will be read by the photographic printer. The instructions will indicate to the printer the changes to its normal automatic exposure settings to alter the color or density in the direction and to the degree specified. Then the operator reassembles the remaining components of the order and continues with the next order. When the laminator operator has completed a batch of makeover orders, the laminated roll of filmstrips, the sequenced bundle set of associated order materials, and usually a diskette of information is sent to the photographic printer to produce a roll of remade prints.

The rest of the workflow is similar to the original production workflow in that the prints are processed and sent through inspection, finishing and packaging steps where both the new prints and the laminated web of filmstrips are cut and packaged into the appropriate orders. If defects are again found in the new prints, the makeover process can be repeated or the order is sent to a minilab to make replacement prints.

With regard to a minilab, a small number of makeover orders can be sometimes sent to a minilab where an operator produces a new photographic print or other product in much the same way that a new customer order will be produced using the original film or other media. The difference between a new order and a makeover order in this case is that only the selected products are produced and the operator makes adjustments, inspects, and remakes the print or other product as needed until it is acceptable. Minilabs are used sparingly for makeover because they are relatively slow, and set up is required for each order.

Other types of products made in current photofinishing systems or labs such as enlargements, T-shirts, covers, etc., which need makeover, are typically reproduced from the original input media in the same manner that the original was produced. Even when products such as these are made by the new digital methods rather than optical, each product typically involves a unique process for makeovers.

Therefore, the conventional makeover process as described above, requires a large amount of labor, capitol equipment and materials. For example, labor is associated with lamination and the subsequent cutting and repackaging of film. Further, the materials used for lamination add to the labor and cost of the makeover process. The conventional makeover process for other products involve different workflows and typically require reworking the original media through much of the original production process.

Further, conventional photofinishing systems use optical printing methods with limited ability to improve the images other than overall color and density, and can only apply corrections to the overall image.

SUMMARY OF THE INVENTION

The present invention provides for a novel makeover workflow system and process in a digital photofinishing system. The makeover workflow process of the present invention eliminates the need for laminating equipment and additional equipment that are used to handle laminated webs in the conventional makeover process. Further, the labor and materials necessary in the lamination process of the conventional makeover system are not needed with the makeover workflow system of the present invention.

The makeover workflow process and system of the present invention is adapted to reproduce prints or other products from the acquired images without going back to the original film or input media. Makeovers in accordance with the present invention will not require separate processes for different input media such as film or digital memory media, or for different output products such as prints, CDs, or other types of products that are produced by the digital system.

Further, the makeover workflow system of the present invention is not limited to improvement of images for overall color and density. The makeover workflow system of the present invention is able to specify corrections to images in addition to color and density. For example, in situations where it is advantageous to apply corrections to specific areas of the image instead of the overall image, the makeover system of the present invention allows the specific areas of the images to be selected to apply the corrections. As an example, corrections in accordance with the present invention can include the selection of red eyes that were missed by automatic algorithms or the removal of specific incorrectly applied enhancements such as red spots that were misinterpreted as red eyes.

The makeover process and system of the present invention is further adapted to make corrections to a variety of image enhancement features and to select areas of corrections in the image due to the fact that the processing system of the present invention utilizes previously stored data that describes the operations that have been previously applied to the image. In this way, the previous operations can be applied exactly as before or with specific changes applied through the makeover system. This provides for an improvement over conventional systems where the results of automatic processes can sometimes vary when repeated. This also helps insure order uniformity since makeovers and conventional systems do not always match well with the rest of the order.

The makeover system of the present invention as noted above utilizes previously stored images along with the previously stored processing data and the makeover corrections to produce images for display to the makeover operator. This helps verify the expected modifications before reproducing the product and is not possible in conventional optical printing systems.

Further, the makeover processing system of the present invention aids productivity by using computer algorithms and an interface to help build makeover batches for different products from the variety of orders. Multiple batches can be built in parallel and released for production without the delays inherent in the manual operations of conventional systems. Makeover write-up can be done directly into the system, reducing the labor over the conventional method. Further, queuing delays would be reduced or eliminated and the lamination step of conventional systems would also be eliminated. Also, the number of batches that needed to be created because of orders with different film types and services can be reduced because the makeovers are being produced from images in a digital system which can treat each image separately. The result would be fewer inefficient batches.

If connected to an automatic inspection or operator assisted automatic inspection system, the makeover information could be directly entered into the makeover system of the present invention. This opens the possibility for increased efficiency and workflow with further reduced labor costs.

The present invention accordingly provides for a makeover workflow method or process for a photographic processing system which comprises the steps of processing original images in accordance with customer orders; storing the original images and associated image processing data used to process the original images; inspecting the processed images for defects; and reprocessing a processed image in which a defect has been detected during the inspecting step. The reprocessing step comprises determining change data for correcting the processed image having a defect; reacquiring the stored original image and the stored image processing data associated with the stored original image which corresponds to the processed image having a defect; combining the acquired image processing data and the change data to determine image correction makeover data for the processed image having a defect; and applying the image correction makeover data to restore the original image which corresponds to the processed image having a defect, so as to create a corrected image.

The present invention also relates to a photofinishing arrangement that comprises a processing section adapted to process captured images; a storing section adapted to store the captured image and image processing data used by the processing section to process the captured images; an inspection section adapted to inspect the processed images for defects; and a reprocessing section adapted to reprocess a processed image having a defect. The reprocessing section is further adapted to determine change data for correcting the processed image having a defect, acquire the stored captured image and the image processing data associated with the stored captured image which correspond to the processed image having a defect, combine the acquired image processing data and the change data to determine image correction makeover data for the processed image having a defect, and apply the image correction makeover data to the stored captured image which corresponds to the processed image having a defect so as to create a corrected image.

The present invention also relates to a makeover flow method for a photographic processing system which comprises the steps of processing an original image in accordance with a customer order; storing the original image and associated image processing data used to process the original image; inspecting the processed image for defects; and reprocessing the processed image if a defect has been detected during the inspecting step. The reprocessing step comprises acquiring the stored original image and the stored image processing data associated with the stored original image; using the acquired processing data as a basis to determine image correction makeover data for the processed image having a defect; and applying the image correction makeover data to the stored original image to create a corrected image.

DETAILED DESCRIPTION OF THE INVENTION

Figure 1:
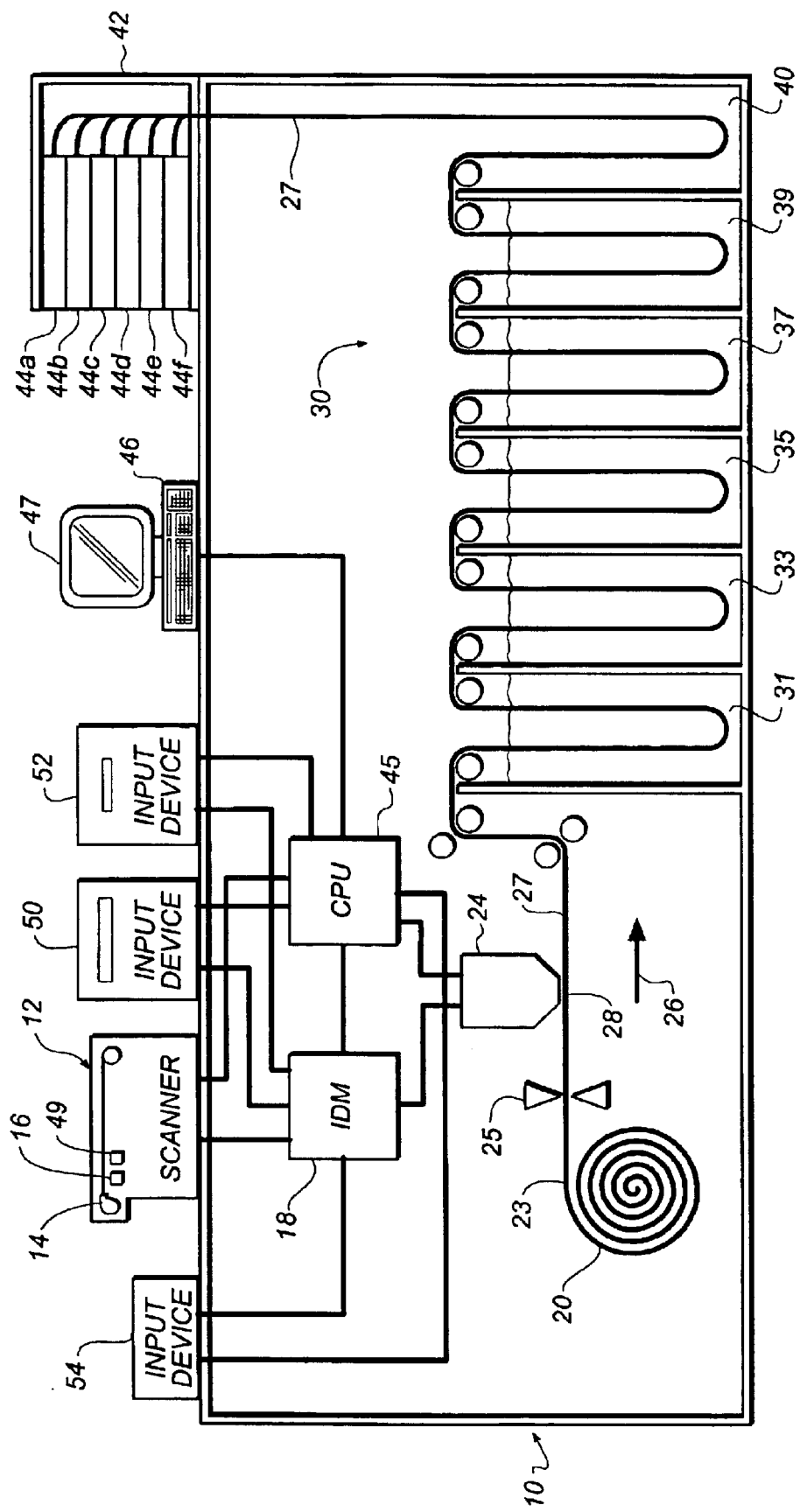
FIG. 1 is a schematic view of an apparatus which can be used to produce prints in accordance with the present invention.

Referring now to the drawings, while like reference numbers represent identical or corresponding parts throughout the several views, the present invention provides for a makeover workflow system that is associated with a digital photofinishing system. The makeover workflow system of the present invention permits the selection of products or images to be made again to replace products or images which have been damaged, incorrectly produced, or which may need correction to the image content for improved appearance or defect removal.

Referring now to FIG. 1, in one embodiment of the invention, a customer order involves processing photographic film having exposed images thereon. In order to process the photographic film, an apparatus 10 as illustrated in FIG. 1 may be utilized. As shown in FIG. 1, apparatus 10 can be designed to print digital images onto photosensitive media, paper or material in accordance with a customer image order. Apparatus 10 can be of the type commonly referred to as a photographic minilab. A customer image order for the purpose of the present invention can be a roll of developed photographic film as noted above, or a digital record file of a printing order containing a plurality of images thereon (i.e., images transferred to the lab via the internet or a digital storage media). In the particular embodiment illustrated, apparatus 10 includes a scanner 12 which is designed to receive and scan a roll of developed film 14. The roll of developed film 14 is transported past sensor 16 in scanner 12 which scans the images on film 14 so as to provide a digital record of the customer images. Scanner 12 scans at a resolution sufficient to provide quality prints as well as an index print. The digital record of the image is forwarded to an image data manager (IDM 18) where the images are manipulated as preprogrammed. In the embodiment illustrated, IDM 18 comprises a computer (microprocessor) used for manipulation of the digital images contained in the digital record file. IDM 18 further includes a memory for storing of the digital record of the customer image order.

Apparatus 10 further includes a supply roll 20 containing a web of photosensitive media 23, which in the present invention comprises photographic paper. A cutting mechanism 25 is provided for cutting the web of photosensitive media into individual cut sheets. The mechanism 25 may cut the web into sheets having any desired lengths. Appropriate transport mechanisms, not shown, are provided for advancing of the cut sheets in the direction indicated by arrow 26 along processing path 27 through apparatus 10. In particular, the cut sheets are transported from cutting mechanism 25 to an exposure gate 28 whereby digital printer 24 exposes the individual images of the customer image order onto individual sheets, respectively, as they pass exposure gate 28.

Apparatus 10 is further provided with a processing section 30 wherein the cut sheets, after leaving exposure gate 28 are passed therethrough for development as is customarily done in such devices. In the particular embodiment illustrated, the cut sheets are passed through a developer station 31 containing developer solution, a bleach/fix station 33 containing a bleach/fix solution, and a plurality of wash stations 35, 37 and 39 each containing a washing solution, and through a dryer section 40 for drying the photosensitive media. It is noted that the present invention is not limited to a development system as shown and that rapid film development systems of the type which use a minimal amount of processing solution are also applicable to the present invention. The individual prints of the images are then forwarded to a sorter 42 wherein the prints for each customer image order are collated into separate bins 44a–44f, each bin preferably receiving an individual customer image order. It is to be understood that any desired number of bins 44 may be provided as appropriate for apparatus 10 and sorted in accordance with any desired sorting criteria.

As is customary, a CPU (computer) 45, is provided for controlling operation of apparatus 10 and its various components. A user/operator interface 46, which includes a viewing screen 47, is also provided, for allowing an operator to enter instructions for operation of apparatus 10 and monitor operation of the apparatus as is customarily done.

An appropriate computer printing program is provided for controlling operation of IDM 18. The computer program is provided in an appropriate format which allows loading of the program into apparatus 10 which causes IDM 18 to perform the required steps. In particular, the computer program is designed so that IDM 18 will first obtain and store a complete customer image order prior to printing. Within the context of the present invention, when processing the customer order, the image can be scanned to detect defects such as red-eye, underexposure, overexposure, etc. Appropriate enhancement and/or correction algorithms, which have been preprogrammed into IDM 18, can then be applied to the customer image order so as to correct the defects and/or improve the overall aesthetic appearance of the images when printed. It is to be understood that any desired enhancements and/or corrections may be applied to the images. Within the context of the present invention, the process of producing a digitally enhanced image, as an example, can comprise changing pixel values to maximize content that is captured either on film or digitally. For example, but not by way of limitation, the following are a few of the enhancements that may be applied: contrast adjustment, red-eye removal, color balance, removal of dust marks or scratches and sharpness adjustments. In addition, custom corrections, such as crop and zoom, can be programmed or manually entered into the digital printer. After the stored digital images are enhanced, they are forwarded to printer 24 for printing.

Figure 2:
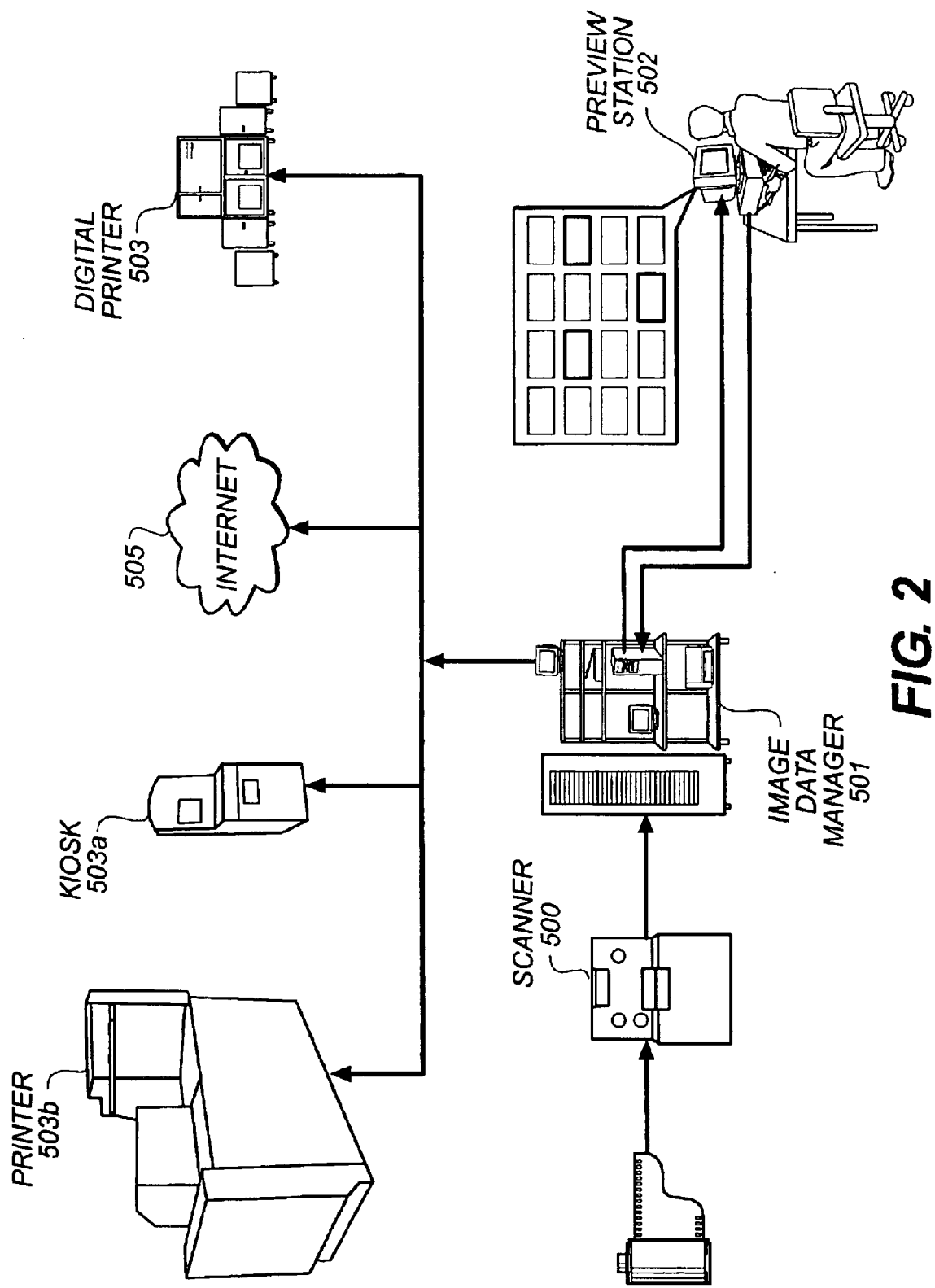
FIG. 2 is a schematic illustration of a further processing or photofinishing system which can be used to create prints in accordance with the present invention.

In addition to using a minilab, photographic prints or products in accordance with the present invention can be realized through use of a wholesale lab as illustrated in FIG. 2. As shown in FIG. 2, a customer order including film is scanned at a scanner 500. From there, the digital record of the images is processed at IDM 501, and optionally, an operator can preview images at a preview station 502. A digital printer 503 can be operationally associated with IDM 501 to produce service prints, index prints, etc. based on the customer order. As a further option, the images can be forwarded to the lab via the internet and can be forwarded to a customer's home computer or some further remote location via an internet connection 505. As a still further option, the images can be received from and/or forwarded to a kiosk 503a operationally associated with IDM 501 via a kiosk connection or forwarded to a remote printer 503b.

Figure 3:
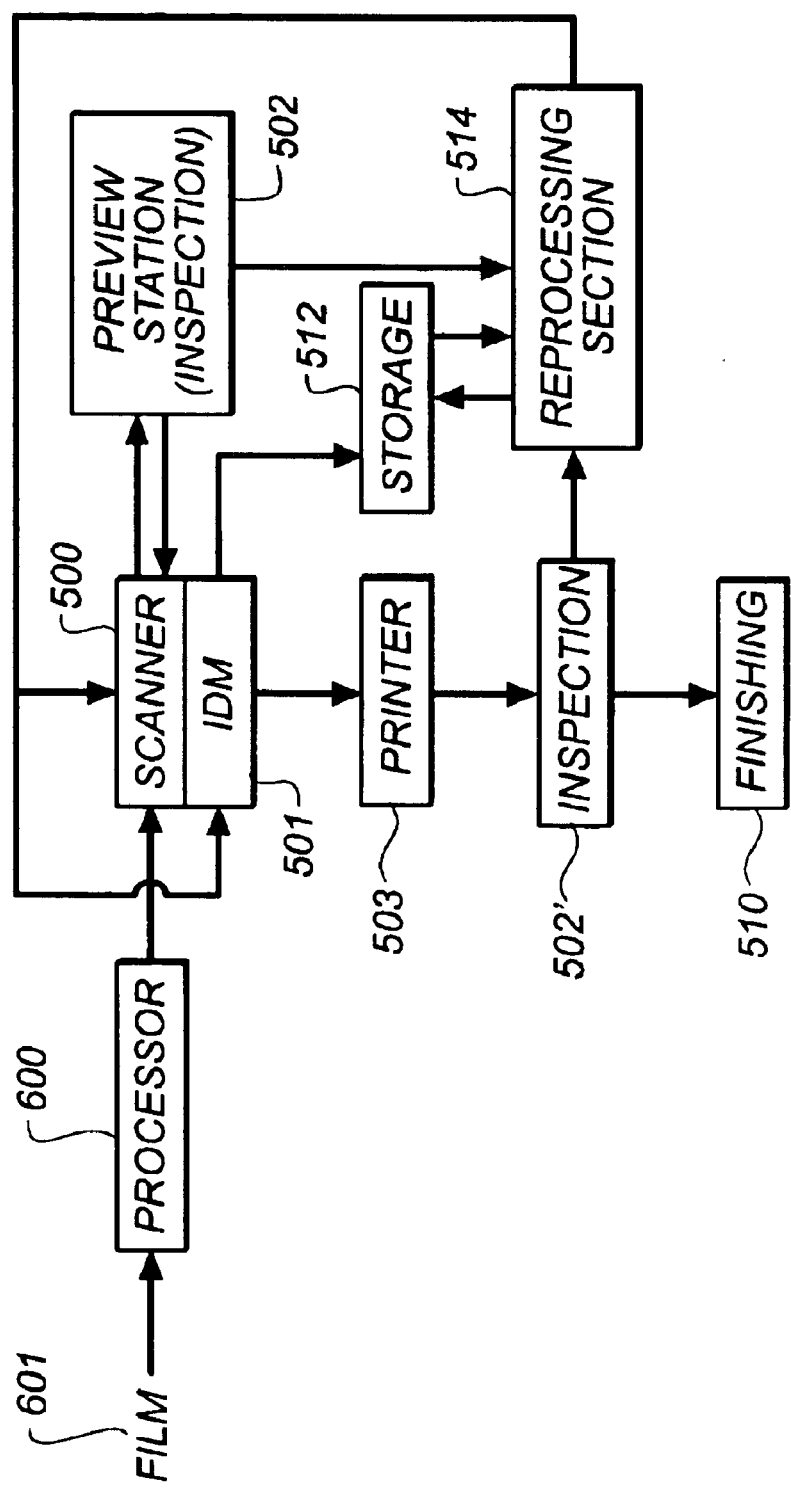
FIG. 3 is a schematic illustration of a photofinishing arrangement having a reprocessing or makeover section in accordance with the present invention.

FIG. 3 illustrates a photofinishing arrangement that is incorporated with a makeover workflow system or method in accordance with the present invention. The photofinishing arrangement is based on the arrangement illustrated in FIG. 2, however, the present invention is not limited thereto, and the photofinishing arrangement in accordance with the present invention can also be based on the arrangement shown in FIG. 1 or some other arrangement for processing images and printing.

With reference to FIG. 3, film 601 is provided to a processor 600 for development of the photographic images on the film. Processor 600 could be a processor which develops film by way of processing solution or material. Thereafter, the film is transferred to scanner 500 where the images on the film are scanned and manipulated by way of an IDM 501. At this point, the photofinishing arrangement of the present invention could include a preview station 502 where an operator can preview scanned images. This gives the operator an opportunity to view the images for defects which can be discovered through the preview station. Within the context of the present insertion, preview can be used to correct image orientation for CD's or specialty products, to select images for special products, to reject images that are unacceptable for production, and to check for defects such as scratches or dust artifacts introduced at or before scanning which may indicate the need for maintenance. Preview can also be used to make adjustments to images such as color and density, a subset of what is looked for at a further product inspection station 502'. In this way preview can be used to reduce the occurrence of some defects in prints or other products, although at this stage of production some operations such as image adjustments for color and density may be considered unproductive. It is noted that the preview process as described could be visual or automated, can be on a display as shown, or could be a preview of an actual product.

In a further feature of the present invention, the images as submitted by the customer can be stored in a storage unit or section 512. Along with each of the images, imaging processing data used to process the original images at the processor and/or the scanner are also stored in storage section 512.

As shown in FIG. 3, after scanning, the images can be printed by way of printer 503 and the printed images or products can be inspected at further inspection station 502'. If the images as inspected at station 502' and/or station 502 are acceptable, or within acceptable limits, the products can be produced and/or assembled at a finishing station 510.

In a feature of the present invention, if a defect of an unacceptable nature is located in the images or the photographic or digital products, the present invention provides for the reprocessing of the images or products. More specifically, if the images which are inspected at preview station 502 and/or after printing, at inspection station 502' include a defect, the defective images are transferred to a reprocessing section 514. Separation of the defective product from the good product can be done during inspection at station 502' or finishing at station 510. Reprocessing section 514 can include a computer or a CPU associated with IDM 501 and is adapted to determine change data needed to correct the image having a defect.

Change data relates to the collection of details or parameters describing the specific alterations, if any, determined to be needed from inspection or preview that will be applied to the image correction data already used to produce the product or image, so that the product or image can be remade without the observed defects. In so doing, the change data may also cause the activation or deactivation of imaging processing features available in the system for the image of interest. The parameters may include, but are not limited to the direction, degree, and location, as appropriate, for color hue and saturation, density, contrast, brightness, scratches, dust spots, red eyes, sharpening, orientation, and cropping. Products having only physical defects can be remade without changes to the original image correction data. Change data then is relative to the previously applied processing, the results of which are observed in preview or inspection. Further, reprocessing section 514 acquires the stored original image and the stored image processing data associated with the stored original image that corresponds to the processed image having a defect from storage section 512. At that point, reprocessing section 514 is adapted to combine the acquired image processing data from storage section 512 as well as the change data to determine the image correction makeover data for the processed image having a defect. This image correction makeover data is applied to the original image submitted by the consumer which corresponds to the processed image having a defect so as to create a corrected image. That is, from reprocessing section 514, the image can be sent to either IDM 501 or scanner 500 depending on the source of the defect, and the image can be reprocessed in accordance with the image correction makeover data, for subsequent reviewing at preview station 502 or printing at printer 503.

Figure 4:
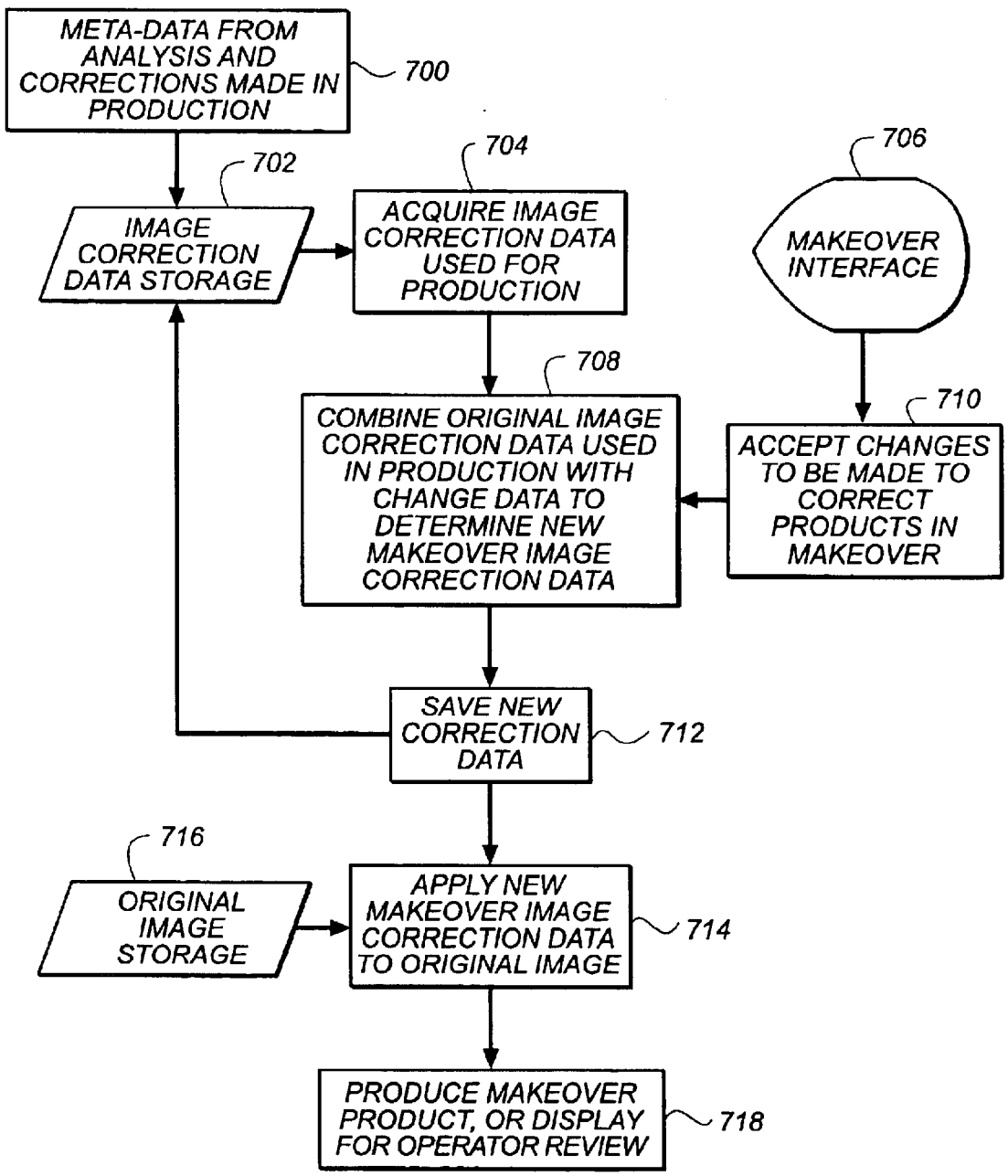
FIG. 4 is a flow chart detailing a makeover operation with respect to the present invention.

A workflow arrangement based on the photofinishing arrangement illustrated in FIG. 3 is illustrated in FIG. 4. As shown in FIG. 4, the reprocessing section or makeover arrangement of the present invention has image processing data and/or metadata from the analysis and corrections made to the original image during the production of the processed image by way of the IDM or scanner (step 700). This image processing data or metadata which is considered image correction data, as well as the original image are stored in storage section 512 (step 702). When a defect is noted, change data for correcting the defect is determined from operator instructions based on inspection of the product or processed images or from an automated inspection device input through a makeover interface (step 706) and acquired to form the change data (step 710). The image correction data used in production is acquired (step 704) and then combined with the change data to determine a new makeover image correction data (step 708). In the system of the present invention, this could be done at a station having a makeover interface (step 706) which provides the operator the opportunity to accept changes to be made to correct the image or products in the makeover process (step 710). In a further feature of the invention, this new makeover correction data can be saved (step 712) and sent back to the storage section 512 in the event that additional corrections need to be made to the image.

After the image correction changeover data is determined, it is applied to the original image (step 714) which is retrieved from storage 512 (step 716) and thereafter, the corrected product or image can be produced or displayed for operator review (step 718). In the system and method of the present invention, the image can be reviewed at preview station 502 or the makeover interface (step 706) of reprocessing section 514 and the product can be produced on printer 503. It is noted that the product produced could be a photographic based product such as prints having the corrected image; however, the present invention is not limited to such products. Products produced by the present invention can also be digital products having the corrected image such as CD's, disks, uploads, etc.

Therefore, in the present invention a photofinishing system is adapted to scan various film or print media and produce digital images or import digital images from media or communication links. The images pass through various stages of processing and storage to manufacture products containing images to be transmitted, stored or printed onto media. The photofinishing system both acquires and generates processing data or meta-data which describes the input images and/or media, the identification and tracking data, the products or images to be manufactured, and the results of various processing steps. Production is normally organized in units of orders and batches of orders for production efficiency and accuracy of tracking materials and data.

The makeover system as shown in FIGS. 3 and 4 including reprocessing section 514 (FIG. 3) utilize the photofinishing system metadata and stored images, if available, to remanufacture the same or improved products and images. Through the use of processes and user interface selections or input from automated inspection systems, the makeover system will combine the expressed makeover needs with the existing processing data or metadata to construct new orders and batches which are compatible with the photofinishing system. These makeover orders and batches can then be efficiently produced using the same production equipment that manufactured the first product. In addition, the makeover system aids in organizing the orders and batches, and makes changes to the metadata to allow proper workflow and tracking for production.

Metadata or processing data defining the operations performed in first production is used as the starting point for corrections to image appearance or modifications relating to defect corrections. Images optionally produced for makeover operator first viewing on a monitor are based on the original metadata and processes. Changes are made by adjustments to the first time corrections which are added to or subtracted from the original metadata. The changes in metadata alter the extent of processing or turn on or off algorithms available to effect the appearance and perform defect corrections expressed by either operator input or input from automated inspection systems. Operator input can be based on viewing the image on a monitor or by viewing the first product.

Images can be displayed for the operator to show a representation of the image as first produced (including previously made corrections such as by a preview operator), and then after changes are requested, to show a representation of the effects of the changes to allow the opportunity to undo or alter the requested changes prior to making the product. Various sizes and arrangements of images can be displayed. For efficiency and performance, selected areas of images rather than the entire image can be displayed in higher resolutions to aid in correcting images. In particular, regions of images containing defects of interest can be automatically cropped and zoomed to highlight defects such as red-eye which can be difficult to see in lower resolutions. The operator can then confirm or modify the corrections to be made as appropriate for the type of defect through the positioning of geometric shapes and/or menu selections in the user interface.

The user interface provides the means for an operator to enter the order and/or batch identification and specify the images and products to be made over. In addition, the user interface displays the state of current operations. Customary input devices such as keyboard, mouse, touch screen, and bar code readers are used. The user interface can be on a dedicated workstation or can be used in a shared fashion on another photofinishing component such as a preview station or a reorder station.

Input from automated inspection systems is accomplished through a communication interface associated with IDM 501 and reprocessing section 514. The makeover system works with metadata incorporated in the industry standard Photofinishing Data Format (PfDF) for identification of image frames, orders, and batches. This allows the use of standard identification data and organization of work to be done that is consistent with standard lab operations. Orders from numerous first batches can be combined into new production batches such that the production sequence is compatible with the needs to combine with other physical materials that are part of the orders. This batch maker functionality interacts with the operator through a user interface such that the makeover orders entered by the operator are sequenced to match the material handled by the operator. One or more production batches can be built concurrently based on rules or categories define what orders can be included in the same batch. Batch size and production schedule rules can also be defined.

The invention has been described in detail with particular reference to certain preferred embodiments thereof, but it will be understood that variations and modifications can be effected within the spirit and scope of the invention.

What is claimed is:

1. A makeover workflow method for a photographic processing system, the method comprising the steps of:

processing original images in accordance with customer orders;

storing said original images and associated image processing data used to process said original images;

inspecting said processed images for defects; and reprocessing a processed image in which a defect has been detected during said inspecting step;

wherein said reprocessing step comprises:

determining change data for correcting the processed image having a defect;

acquiring the stored original image and the stored image processing data associated with the stored original image which correspond to the processed image having a defect;

combining the acquired image processing data and the change data to determine image correction makeover data for the processed image having a defect; and applying the image correction makeover data to the stored original image which corresponds to the processed image having a defect, so as to create a corrected image.

2. A method according to claim 1, comprising the further step of:

storing the image correction makeover data.

3. A method according to claim 1, comprising the further step of:

producing at least one of a photographic or digital product having the corrected image.

4. A method according to claim 1, comprising the further step of:

printing the corrected image.

5. A method according to claim 1, comprising the further step of:

displaying the corrected image on a display device.

6. A method according to claim 1, wherein said defect is at least one of physical damage, visual flaws, incorrect color, incorrect density and incorrect image enhancement applications.

7. A method according to claim 1, comprising a plurality of said processed images having defects, wherein said method comprising placing said plurality of processed images having defects in a batch during said reprocessing step.

8. A method according to claim 1, wherein said inspecting step comprises inspecting at least one specific area of the processed images.

9. A method according to claim 8, wherein said at least one specific area is an area that include eyes of the processed images, and said defect includes at least red eyes on the processed images.

10. A photofinishing arrangement comprising:

a processing section adapted to process captured images;

a storing section adapted to store the captured images and image processing data used by said processing section to process the captured images;

an inspection section adapted to inspect the processed images for defects; and a reprocessing section adapted to reprocess a processed image having a defect;

wherein said reprocessing section is further adapted to determine change data for correcting the processed image having a defect, acquire the stored captured image and the image processing data associated with the stored captured image which correspond to the processed image having a defect, combine the acquired image processing data and the change data to determine image correction makeover data for the processed image having a defect, and apply the image correction makeover data to the stored captured image which corresponds to the processed image having a defect, so as to create a corrected image.

11. An arrangement according to claim 10, wherein said storing section is further adapted to store the image correction makeover data.

12. An arrangement according to claim 10, further comprising a photographic product production section adapted to produce a photographic or digital product having the corrected image.

13. An arrangement according to claim 10, further comprising a printer adapted to print the corrected image.

14. An arrangement according to claim 10, further comprising a display device adapted to display the corrected image.

15. An arrangement according to claim 10, wherein said defect is at least one of physical damage, visual flaws, incorrect color, incorrect density, and incorrect image enhancement applications.

16. An arrangement according to claim 10, further comprising a plurality of said processed images having defects that are placed in a batch during said reprocessing.

17. An arrangement according to claim 10, wherein said inspection station is adapted to inspect at least one specific area of the processed images.

18. An arrangement according to claim 17, wherein said at least one specific area is an area that includes eyes of the processed images, and said defect includes at least red eyes on the processed images.

19. A makeover workflow method for a photographic processing system, the method comprising the steps of:

processing at least one original image in accordance with a customer order;

storing said original image and associated image processing data used to process said original image;

inspecting said processed image for defects; and reprocessing said processed image if a defect has been detected during said inspecting step;

wherein said reprocessing step comprises:

acquiring the stored original image and the stored image processing data associated with the stored original image;

using the acquired image processing data as a basis to determine image correction makeover data for the processed image having a defect; and applying the image correction makeover data to the stored original image to create a corrected image.

* * * * *